United States Patent
Eiffler et al.

(10) Patent No.: US 6,225,436 B1
(45) Date of Patent: May 1, 2001

(54) POLYCARBONATE PREPARATION PROCESS

(75) Inventors: Juergen Eiffler, Stade; Guenter A. Jueptner, Hammah, both of (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/544,744

(22) Filed: Apr. 7, 2000

(51) Int. Cl.$^7$ .................................................. C08G 64/00
(52) U.S. Cl. .................................................. 528/196
(58) Field of Search ............................................. 528/196

(56) References Cited

U.S. PATENT DOCUMENTS

| | | | |
|---|---|---|---|
| 2,999,835 | * | 9/1961 | Goldberg .............................. 528/176 |
| 3,038,365 | * | 6/1962 | Peterson .............................. 528/176 |
| 3,169,121 | * | 2/1965 | Goldberg .............................. 528/176 |
| 3,334,154 | * | 8/1967 | Kim .................................... 528/196 |
| 4,001,184 | * | 1/1977 | Scott ................................... 528/196 |
| 4,299,928 | * | 11/1981 | Witman .................................. 525/67 |
| 4,367,186 | * | 1/1983 | Adelmann et al. ...................... 264/22 |
| 4,627,949 | * | 12/1986 | Dhein et al. ......................... 264/101 |
| 4,962,144 | * | 10/1990 | Babillis et al. ...................... 524/118 |
| 5,142,088 | * | 8/1992 | Phelps et al. ........................ 558/281 |
| 5,171,824 | * | 12/1992 | Marks et al. ......................... 528/198 |

FOREIGN PATENT DOCUMENTS

| | | | |
|---|---|---|---|
| 273 144 | * | 7/1988 | (EP) . |
| 369 422 | * | 5/1990 | (EP) . |
| 423 562 B1 | * | 4/1991 | (EP) . |
| WO 94/18258 | * | 8/1994 | (WO) . |

* cited by examiner

Primary Examiner—Terressa M. Boykin

(57) ABSTRACT

Disclosed is a polycarbonate composition and process from making same, wherein introduction of a chain terminator and an acyl halide other than phosgene is after at least 25 percent of the hydroxyl groups in the dihydric phenol have been converted to chloroformate groups.

17 Claims, No Drawings

POLYCARBONATE PREPARATION PROCESS

FIELD OF THE INVENTION

The present invention relates to a process for preparing polycarbonates, and especially for producing branched polycarbonates, using acyl halide compounds.

BACKGROUND OF THE INVENTION

Processes for preparing polycarbonates are known in the art. Generally a dihydric phenol, such as bisphenol A is reacted with the use of optional monofunctional compounds as chain terminators and tri-functional or higher functional compounds as branching or crosslinking agents. Reactive acyl halides are also condensation polymerizable and have been used in polycarbonates as terminating compounds (mono-functional), comonomers (di-functional) or branching agents (tri-functional or higher).

U.S. Pat. No. 4,367,186 disclose a process for producing cross-linked polycarbonates wherein a cross-linkable polycarbonate contains methacrylic acid chloride as a chain terminator. A mixture of bisphenol A, aqueous sodium hydroxide and methylene chloride is prepared. To this is added a solution of methacrylic acid chloride in methylene chloride. Then, phosgene is added and an additional amount of aqueous sodium hydroxide are added to keep the pH between 13 and 14. Finally, the triethylamine coupling catalyst is added. Unfortunately, in a process such as this where an acid chloride is added to the reaction mixture when it is at a high pH, a major portion of the acid chloride hydrolyzes to the non-reactive acid form under the alkaline reaction conditions. Furthermore, a portion of the methacrylic acid chloride reacts with bisphenol A (two moles of phosgene, one mole of bisphenol A, two moles acid chloride) to form low weight molecular weight dicarbonates which have a negative impact on the mechanical properties of the produced polycarbonate.

EP 273 144 discloses a branched poly(ester)carbonate which is end capped with a reactive structure of the formula —C(O)—CH=CH—R, wherein R is hydrogen or $C_{1-3}$-alkyl. This polycarbonate is prepared in a conventional manner using a branching agent, such as trimellityl trichloride and an acryloyl chloride to provide the reactive end groups. According to the examples the process is carried out by mixing water, methylene chloride, triethylamine, bisphenol A and optionally para-t-butyl phenol as a chain terminating agent. The pH is maintained at 9 to 10 by addition of aqueous sodium hydroxide. A mixture of terephthaloyl dichloride, isophthaloyl dichloride, methylene chloride, and optionally acryloyl chloride and trimellityl trichloride is added dropwise. Phosgene is then introduced slowly into the reaction mixture. While this procedure may be useful on laboratory scale, it is not suitable for large scale continuous production.

U.S. Pat. No. 5,171,824 discloses a process for the preparation of arylcyclobutene terminated condensation polymers wherein an arylcyclobutene chain terminating compound is added to a condensation polymerization process along with a multihydric compound, such as bisphenol A, and a condensation polymer precursor, such as phosgene, a haloformate or a carbonate ester. The condensation polymerization is conducted at a pH of 12.5. Unfortunately, a major portion of the arylcyclobutene chain terminating compound, such as benzocyclobutene-4-carbonyl chloride, hydrolyzes under these reaction conditions.

Randomly branched polycarbonates and methods of preparing them are known from U.S. Pat. No. 4,001,184. At least 20 weight percent of a stoichiometric quantity of a carbonate precursor, such as an acyl halide or a haloformate, is reacted with a mixture of a dihydric phenol and at least 0.05 mole percent of a polyfunctional aromatic compound in a medium of water and a solvent for the polycarbonate. The medium contains at least 1.2 mole percent of a polymerization catalyst. Sufficient alkali metal hydroxide is added to the reaction medium to maintain a pH range of 3 to 6 and then sufficient alkali metal hydroxide is added to raise the pH to at least 9 but less than 12 while reacting the remaining carbonate precursor. This procedure is very suitable for batch processes which allow the use of pH electrodes and close control of the pH in the reaction mixture. Unfortunately, this procedure is less suitable in a continuous production process.

U.S. Pat. No. 5,142,088 discusses the disadvantages of branched polycarbonates which are produced according to a conventional process wherein phosgene undergoes reaction with a bisphenol in the presence of a polycarboxylic acid or a derivative thereof, preferably trimellitic acid trichloride, under alkaline conditions typically involving a pH above 10. One of the disadvantages of the conventional process is the formation of diaryl carbonates. Diaryl carbonates are formed as a result of the reaction of phosgene with the monohydric phenol used as a chain terminator. Diaryl carbonates cause numerous problems in polycarbonate molding operations, such as difficulties in removing molded polycarbonate articles from the mold. U.S. Pat. No. 5,142,088 discusses various patents which disclose methods for preparing polycarbonates from chloroformate oligomers, typically comprising mono- and/or bis-chloroformates. Such methods decrease the proportion of diaryl carbonate in the polycarbonate products because the monohydric phenol employed as chain terminating agent is not introduced into the reaction mixture until the chloroformate composition has been prepared and unreacted phosgene has been purged from the system. Also see EP 369 422 and WO 94/18258 which teach a method to reduce diaryl carbonate formation by withholding addition of the chain terminating agent to a polycarbonate reaction mixture until the reaction of a bisphenol with phosgene has substantially been completed.

However, U.S. Pat. No. 5,142,088 teaches that incorporation of branching agents, such as trimellitic acid trichloride, in polycarbonate-forming reactions from chloroformate oligomers has generally not proved successful. The branching reaction between a phenolic species and the mentioned branching agent requires a pH in the range from 10 to 12 whereas the chloroformate-forming reaction requires a lower pH, at which incorporation of the branching agent is incomplete. U.S. Pat. No. 5,142,088 indicates that little if any branching results if the above-mentioned branching agent is introduced during conversion of the chloroformate to polycarbonate. In order to solve the problem of producing relatively diaryl carbonate-free branched polycarbonates, U.S. Pat. No. 5,142,088 suggests a process wherein in step (1) an aromatic poly(acyl halide) is reacted with a dihydric phenol in the presence of a catalyst in a reaction system of water, having a pH of 10–12, and a water-insoluble organic system to form an ester polyphenol, in step (2) the pH of the reaction system is reduced to a value from 7 to 10 and phosgene is introduced into the system, and in step (3) a catalyst is added and the pH is raised to value between 10 to 14 to form the polycarbonate. Unfortunately, this process is only suitable for batch operation where the use of pH electrodes and variation of the pH value is possible.

SUMMARY OF THE INVENTION

One object of the present invention is a new process for preparing polycarbonates which allows the condensation reaction incorporation of an acyl halide compound into the polycarbonate in a manner which is suitable in batch processes and in continuous processes. Such acyl halide compounds can be mono-, di-, tri- or higher-functional and are preferably for branching or terminating the polymer molecules or providing other functional moieties at terminal or pendant locations in the polymer molecule. A preferred object of the present invention is to provide an above-mentioned process which does not require close control of the pH by means of a pH electrode. Another preferred object of the present invention is to provide an above-mentioned process which reduces the levels of or preferably eliminates low molecular carbonates or bicarbonates Accordingly, one aspect of the present invention is a process for producing a polycarbonate which comprises the steps of:

a) reacting phosgene and a dihydric phenol until at least 25 percent of the hydroxyl groups in the dihydric phenol have been converted to chloroformate groups, b) adding an acyl halide other than phosgene to the reaction mixture after said at least 25 percent of the hydroxyl groups have been converted, c) adding a chain terminator to the reaction mixture after said at least 25 percent of the hydroxyl groups have been converted and d) completing the polymerization reaction.

Another aspect of the present invention is a polycarbonate composition produced by the above-mentioned process.

Yet another aspect of the present invention is a process for producing a molded polycarbonate article which comprises the steps of:

i) optionally mixing the polycarbonate produced according to the above-mentioned process with one or more additives to prepare a polycarbonate composition and ii) molding the polycarbonate produced according to the above-mentioned process or the polycarbonate composition prepared in step i) to an article.

Yet another aspect of the present invention is a molded article comprised of a polycarbonate produced according to the above-mentioned process.

DETAILED DESCRIPTION OF THE EMBODIMENTS

It is known in the art to produce polycarbonate by the reaction of a carbonic acid derivative, sometimes referred to as a carbonate precursor with a dihydric phenol, such as an aliphatic or aromatic diol. The dihydric phenols employed in the practice of the present invention are dihydric phenols in which the sole reactive groups are the two phenolic hydroxyl groups. Useful dihydric phenols are for example those of the general formula HO—Z—OH, wherein Z comprises a mononuclear or polynuclear aromatic group of 6–30 carbon atoms, to which the oxygen atoms are directly linked. The aromatic group may comprise one or more heteroatoms and may be substituted with one or more groups, for example one or more oxygens, nitrogens, sulfur, phosphorous and/or halogens, one or more monovalent hydrocarbon radicals, such as one or more alkyl, cycloalkyl or aryl groups and/or one or more alkoxy and/or aryloxy groups.

Preferred meanings for Z are groups of formula 1:

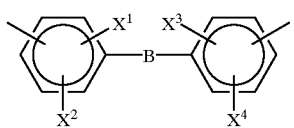

(1)

wherein B is a single bond, a divalent hydrocarbon radical containing 1–15 carbon atoms, preferably 1 to 6 carbon atoms, most preferably —C(CH$_3$)$_2$—, —S—, —S—S—, —S(O)—, —S(O$_2$)—, —O— or —C(O)— and X$^1$, X$^2$, X$^3$ and X$^4$ independently are hydrogen; halogen, preferably chlorine, bromine or fluorine; a monovalent hydrocarbon radical, such as alkyl, cycloalkyl or aryl; alkoxy or aryloxy. Preferred alkyl groups contain 1 to 6, more preferably 1 to 4 carbon atoms, such as methyl, ethyl, n-propyl, i-propyl, n-butyl, s-butyl or t-butyl or the pentyl or hexyl groups. Preferred cycloalkyl groups contain 5 or 6 carbon atoms, such as cyclopentyl or cyclohexyl. Preferred aryl and aryloxy groups contain 6–8 carbon atoms, such as phenyl, benzyl, phenyloxy, tolyl or xylyl. Preferred alkoxy groups contain1 to 6 carbon atoms, more preferably1 to 4 carbon atoms, such as the methoxy, ethoxy, n-propoxy, i-propoxy, n-butoxy, s-butoxy or t-butoxy groups. Preferably, both phenolic hydroxy groups in the dihydric phenol HO—Z—OH are arranged in para-position to the radical B in the group of formula 1.

The dihydric phenols employed in the process of the present invention include the bis(aryl-hydroxy-phenyl) alkylidenes including their aromatically and aliphatically substituted derivatives, such as disclosed in U.S. Pat. Nos. 2,999,835; 3,038,365; 3,334,154 and 4,299,928; and aromatic diols such as described in U.S. Pat. No. 3,169,121.

Preferred examples of dihydric phenols of the general formula HO—Z—OH are bis(hydroxyphenyl)fluorenes, such as 9,9-bis-(4-hydroxyphenyl) fluorene; dihydroxy benzenes and the halo- and alkyl-substituted dihydroxy benzenes, such as hydroquinone, resorcinol, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimetylbenzene and 1,4-dihydroxy-2-bromo-3-propylbenzene; alpha,alpha'-bis (hydroxyphenyl)-diisopropylbenzenes; dihydroxybiphenylenes, such as 4,4'-dihydroxydiphenyl; the halo- and alkyl substituted dihydroxybiphenylenes, such as 3,3'-dimethyl-4,4'-dihydroxydiphenyl, 3,3'-diethyl-4,4'-dihydroxydiphenyl, 3,3'-dichloro-4,4'-dihydroxydiphenyl or 3,3',5,5'-tetrabromo-4,4'-dihydroxydiphenyl; bis (hydroxyphenyl)alkanes, such as bis(4-hydroxylphenyl) methane, 1,1-bis(4-hydroxyphenyl)ethane, 1,1-bis(4-hydroxyphenyl)propane, or, most preferably, 2,2-bis(4-hydroxyphenyl)propane ("bisphenol A"), 1,1-bis(4-hydroxyphenyl)butane, 4,4-bis(4-hydroxyphenyl)heptane, alkyl-, aryl- or halosubstituted bis(hydroxyphenyl)alkanes, such as 1,1-bis(4-hydroxyphenyl)-1,1-diphenyl methane, 1,1-bis(3-methyl-4-hydroxyphenyl)ethane, 1-phenyl-1,1-bis (4-hydroxyphenyl)ethane ("bisphenol AP"), 2,2-bis(3,5-dibromo-4-hydroxyphenyl)propane, 1-phenyl-2,2-bis(4-hydroxyphenyl)propane ("phenyl substituted bisphenol A"), 2,2-bis(3,5-dibromo-4-hydroxyphenyl)propane ("tetrabromo bisphenol A"), 2,2-bis(3,5-dichloro-4-hydroxyphenyl)propane ("tetrachloro bisphenol A"), 2,2-bis (3,5-dimethyl-4-hydroxyphenyl)propane ("tetramethyl bisphenol A"); 2,2-bis(3,5-difluoro-4-hydroxyphenyl) butane, 2,2-bis(3,5-dibromo-4-hydroxyphenyl)pentane, 3,3- bis(3-methyl-4-hydroxyphenyl)hexane, 2,2-bis(3-ethyl-4-hydroxyphenyl)octane, 2,2-bis(3,5-dibromo-4-hydroxyphenyl)nonane, 2,2-bis(3,5-isopropyl-4-hydroxyphenyl) nonane, or 2,2-bis(3-propyl-4-hydroxyphenyl)decane; optionally alkyl-, aryl- or halosubstituted bis(hydroxyphenyl)cycloalkanes, such as 1,1-bis(4-hydroxyphenyl) cyclopentane, 1,1-bis(4-hydroxyphenyl)cyclohexane, 1,1-bis-(4-hydroxyphenyl) cycloheptane, 1,1-bis(4-hydroxyphenyl)cyclooctane; 1,1-bis-(4-hydroxyphenyl) cyclodecane or 1,1-bis-(4-hydroxyphenyl)-3,3,5-trimethylcyclohexane; optionally alkyl-, aryl- or halosubstituted bis(hydroxyphenyl)ethers, such as bis(3-chloro-5-methyl-4-hydroxyphenyl)ether, bis(3,5-dibromo-4-hydroxyphenyl)ether, bis(3,5-dichloro-4-hydroxyphenyl)ether, bis(3-ethyl-4-hydroxyphenyl)ether, bis(3-methyl-4-hydroxyphenyl)ether or bis(4-hydroxyphenyl)ether; bis(hydroxyaryl)ketones, bis(4-hydroxyphenyl)ketone; optionally alkyl-, aryl- or halosubstituted bis(hydroxyaryl)sulfones, preferably bis (hydroxyphenyl)sulfones, such as bis(3,5-dimethyl-4-hydroxyphenyl)sulfone, bis(3,5-diisopropyl-4-hydroxyphenyl) sulfone, bis(3-methyl-5-ethyl-4-hydroxyphenyl)sulfone, bis(3,5-dibromo-4-hydroxyphenyl) sulfone, bis(3-chloro-4-hydroxyphenyl)sulfone, bis(3-methyl-4-hydroxyphenyl)sulfone, bis(4-hydroxyphenyl) sulfone, bis(3-hydroxyphenyl)sulfone, or bis(2-hydroxyphenyl)sulfone; bis(hydroxyphenyl)sulfoxides, such as bis(3,5-diisopropyl-4-hydroxyphenyl)sulfoxide, bis (3,5-dibromo-4-hydroxyphenyl) sulfoxide, bis(3,5-dimethyl-4-hydroxyphenyl)sulfoxide, bis(3-methyl-5-ethyl-4-hydroxyphenyl)sulfoxide, bis(3-methyl-4-hydroxyphenyl)sulfoxide or bis(4-hydroxyphenyl) sulfoxide.

Other examples of suitable dihydric phenols are listed in U.S. Pat. No. 4,627,949, column 2, line 68–column 3, lines 1–22, in U.S. Pat. No. 4,962,144, column 2, lines 17–46 and in EP 423 562, page 2, lines 24–55 and page 3, lines 1–19. Mixtures of two or more dihydric phenols may also be used, for example a mixture comprising 1–99% of bisphenol A and 99–1 weight percent of another dihydric phenol, such as 9,9-bis-(4-hydroxyphenyl) fluorene.

Among the most preferred dihydric phenol suitable for production of polycarbonate in the present invention are bisphenol A, bisphenol A P, tetrabromo bisphenol A, and tetramethyl bisphenol A. The most preferred dihydric phenol is bisphenol A.

A carbonate precursor suitable for use in the present invention contains leaving groups which can be displaced from the carbonyl carbon in attack by the anion of a dihydric phenol compound, and includes but is not necessarily limited to diesters of carbonic acid, and carbonyl halides or acyl halides, of which most preferred is phosgene.

The process of the present invention may be a solution polymerization process or preferably an interfacial polymerization process. As is known, a standard interfacial aromatic carbonate polymer polymerization process involves the reaction of the dihydric phenol such as a bisphenol, and the carbonate precursor such as a disubstituted carbonic acid derivative (such as phosgene), or a haloformate (such as a bishaloformate of a glycol or dihydroxy benzene). These components are reacted by means of the phase boundary process in which the dihydric phenol compound is at least partially dissolved and deprotonated in an aqueous alkaline solution to form bisphenolate (phenate) and the carbonate precursor is supplied to the process, preferably dissolved in an organic solvent. The aqueous alkaline solution has a pH in excess of 7.0, often in excess 8.0 or 9.0, preferably at least about 13 to 14, and can be formed in water from a caustic soda, such as NaOH, or from other bases such as alkali metal and alkaline earth metal phosphates, bicarbonates, oxides and hydroxides. Base is typically used over the course of the interfacial polymerization in an amount of about 2 to 4, preferably about 3 to 4, moles per mole of dyhydric phenol compound.

The other phase of the two phase mixture is a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. Caustic soda or other base is added to the reaction mixture to adjust the pH of the mixture to a level at which the dihydric phenol compound is at least partially converted to dianionic form. A reducing agent such as sodium sulfite or sodium dithionite can also be advantageously added to the reaction mixture as well.

A carbonate precursor, preferably phosgene is contacted with the mixture of the aqueous alkaline mixture of the dihydric phenol compound and water-immiscible non-reactive organic solvent. The carbonate precursor can be bubbled into the reaction mixture in the form of a gas, or can be dissolved in the water immiscible non-reactive organic solvent and introduced in solution form.

In typical interfacial polymerization processes, the coupling catalyst can be added either during or after addition of the carbonate precursor without significantly affecting the resulting polymer molecular weight and molecular weight distribution. The coupling catalyst is generally used in amounts typically ranging from about 0.001 to 0.1 moles per mole of dihydric phenol compound. Such coupling catalysts include a tertiary amine such as triethylamine, dimethyl amino pyridine or N,N-dimethyl aniline; a cyclic aza compound such as 2,2,6,6-tetramethyl piperidine or 1,2-dimethylimidazole; an iminoether or iminocarboxylate compound such as 1-aza-2-methoxy-1-cycloheptene or t-butyl-cyclohexyliminoacetate; or a phosphonium, sulfonium, arsonium or quaternary ammonium compound such as cetyl triethylammonium bromide.

The carbonate precursor is typically used in an amount of about 1.0 to 1.8, preferably about 1.2. to 1.5, moles per mole of dihydric phenol compound. The mixture is agitated in a manner which is sufficient to disperse or suspend droplets of the solvent containing the carbonate precursor in the aqueous alkaline mixture. Reaction between the organic and aqueous phases created by such agitation yields the bis (carbonate precursor) ester of the dyhydric phenol compound which either remains as an intermediate, remains as a monomer or oligomer (if no coupling catalyst is present) or polymerizes to the carbonate polymer (when the catalyst is present). For example, if the carbonate precursor is an acyl halide such as phosgene, these intermediates are primarily bischloroformates, although some end groups may instead be a terminator residue, phenolate ion or unreacted hydroxy group.

The polycarbonate forming reaction can be run at a pH from above 7.0 to about 14, and at a temperature between 0° C. to 100° C., although usually not in excess of the boiling point (corrected for the operating pressure) of the solvent used. Frequently, the reaction is run at a temperature of about 0° C. to about 45° C.

A chain terminator is a monofunctional compound containing a functional group, frequently a hydroxyl group, which will produce an anion capable of displacing an unreacted hydroxyl or carbonic acid ester group which remains on the end of the polymer chain. When a terminator is used, the prevalent practice in the art is to admix the terminator with the monomers before the dihydric phenol has been contacted with the carbonyl precursor. Any terminator anion capable of attacking a hydroxy or carbonic acid ester end group on a polymer chain is also capable of undesirably either (1) attacking unreacted molecules of the initial charge of the carbonate precursor or (2) displacing end groups before a chain has an opportunity to grow to the desired length. The practice in the art of adding chain terminator to the reaction mixture prior to introduction of the carbonate precursor consequently allows for the formation of carbonate byproducts by the occurrence of both of the aforementioned results. Carbonate byproduct content detracts from the desirable properties and qualities of polycarbonate, and in most applications, may be see as an impurity therein. For example, low molecular weight carbonates have a negative impact on the mechanical properties of the fmal polycarbonate composition.

Reactive acyl halides other than phosgene are condensation polymerizable and are used in polycarbonates as terminating compounds (mono-functional), comonomers (di-functional) or branching agents (tri-functional or higher). When an acyl halide is used, the prevalent practice in the art is to admix the acyl halide with the monomers before the dihydric phenol has been contacted with the carbonyl precursor. Typically, the aqueous solution of the dihydric phenol in the art have a pH between 13 to 14 before phosgenation is started. Under these conditions the acyl halide is capable of undesirably (1) hydrolyzing, thus limiting the amount of desired chain termination, comonomerization or branching or (2) reacting with the dihydric phenol to form low molecular weight di-, tri- or higher carbonates. Low molecular weight carbonates are usually seen as an impurity and have negative effects on mechanical properties as discussed hereinabove.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

The improvements which are the subject of this invention relate to the timing of the addition of a chain terminator and an acyl halide other than phosgene to a polycarbonate reaction mixture containing a dihydroxy compound and a carbonic acid derivative especially phosgene. It has surprisingly been found that hydrolysis of the acyl halide and the production of low molecular carbonates and bicarbonates can be reduced to a large extent if the chain terminator and the acyl halide other than phosgene are only added to the reaction mixture when at least 25 percent, preferably from 40 to 100 percent, more preferably from 40 to 70 percent of the hydroxyl groups in the dihydric phenol have been converted to chloroformate groups by reaction of the hydroxyl groups with phosgene. Hydroxyl group as defined herein refers to free protonated hydroxyl groups (e.g., —OH groups) of a mono- or dihydric phenol and/or deprotonated hydroxylate groups (e.g., —O$^-$M$^+$, where M$^+$ represents the alkali metal or alkaline earth metal present from the base addition used over the course of the interfacial polymerization) of a mono- or di-hydric phenolate.

The conversion of hydroxyl groups to chloroformate groups can be determined by the addition of 4-(4-nitrobenzyl) pyridine to the methylene chloride phase. The 4-(4-nitrobenzyl) pyridine reacts with the chloroformate group forming an orange colored complex which can be quantified by UV spectroscopy at a wavelength of 438 nanometers (nm) with a coefficient of extinction of 25.5 liter per millimole-centimeter (1/[mmole*cm]). Alternatively, the amount of un-reacted dihydric phenol (and hence hydroxyl groups) can be determined by UV-spectroscopy of the aqueous phase at a wavelength of 293.5 nm with a coefficient of extinction of 0.0225 reciprocal parts per million-centimeter ([ppm*cm]$^{-1}$) and then calculating the amount of converted dihydric phenol from this.

Representative of the terminators which are useful for the production of polycarbonates in the present invention are phenol and the derivatives thereof, saturated aliphatic alcohols, metallic sulfites, alkyl acid chlorides, trialkyl- or triarylsilanols, monohalosilanes, amino alcohols, trialkyl alcohols, aniline and methylanaline. Of these, phenol, para-t-butyl phenol (PTBP), p-cumyl phenol and para-t-octyl phenol (4-(1, 1, 2, 2-tetramethylbutyl)-phenol or PTOP) are the most preferred for use in the present invention.

Preferred acyl halides for use in the present invention are acyl chlorides, acyl bromides and acyl fluorides with acyl chlorides being most preferred. Preferred acyl chlorides for use in the present invention are acryloylchloride, methacryloylchloride, benzoylchloride, benzocyclobutene-4-carbonylchloride, trimellitic anhydride chloride, 4-chloroformyl phthalic anhydride, 2,4-dihydroxy-6-chloro-formyloxy-triazine, benzenesulfonylchloride, chlorodiphenylphosphine, chlorodiphenylphosphineoxide, chlorotrimethylsilane, terephthaloyl chloride, sebacoylchloride, 3,5-dichloroformylbenzoic acid, thionylchloride, dichlorophenylphosphine, dichlorophenylphosphineoxide, dichlorodimethylsilane, dichlorodiphenylsilane, trimellitic trichloride, trimesoylchloride, 1,2,3 propanetricarboxylic chloride, trimethylolpropane tris (chloroformate), tris (chloroformyloxy)triazine, cyanuric chloride, 1,3,6 naphthaline-trisulfonyltrichloride, phosphorous trichloride, trichlorophenylsilane, and thiophenetetracarboxylic acid chloride. Most preferred acyl chlorides are acryloylchloride, trimellitic anhydride chloride and trimellitic trichloride.

In the present invention the terminator and the acyl halide may be added independently of each other, with or without a solvent, but preferably are added together and most preferably added together in the same solvent. If a solvent is used, an inert organic solvent, i.e., stable against alkaline, is preferred such as methylene chloride, dioxane, dimethyl ether, dimethyl glycol diether, diethyl glycol diether, dibutyl glycol diether, or chlorobenzene.

If added separately, the terminator may independently be added in its pure form if it is a liquid. Preferably, the terminator is independently added in solution form, said solution comprising from about 0.0001 to about 99 weight percent by weight of the terminator, preferably about 0.001 to about 70 weight percent, and most preferably about 0.01 to about 50 weight percent of the terminator, said weight percents based on the weight of the solvent.

If added separately, the acyl halide may independently be added in its pure form if it is a liquid. Preferably, the acyl halide is independently added in solution form said solution comprising from about 0.0001 to about 99 weight percent by weight of the acyl halide, preferably about 0.001 to about 70 weight percent, and most preferably about 0.01 to about 50 weight percent of the acyl halide, said weight percents based on the weight of the solvent.

Preferably, the terminator and the acyl halide are added together in the same solvent. In the mixture of terminator, acyl halide and solvent, the terminator is present in an amount from about 0.0001 to about 99 weight percent, preferably in an amount from about 0.001 to about 70 weight percent, and most preferably in an amount from about 0.01 to about 50 weight percent based on the weight of the solvent. In the mixture of terminator, acyl halide and solvent, the acyl halide is present in an amount from about 0.0001 to about 99 weight percent by weight, preferably in an amount from about 0.001 to about 70 weight percent, and most preferably in an amount from about 0.01 to about 50 weight percent based on the weight of the solvent. The solvent is present in an amount from about 0.1 to about 200 weight percent, preferably from about 1 to about 100 weight percent, and most preferably from about 10 to about 50 weight percent based on the weight of the dihydric phenol.

Optionally, an acid may be added independently, with or without solvent, but preferably with the solution containing the acyl halide, terminator and solvent. Preferably the acid is an organic acid, such as para-toluene-sulfonic acid more preferably the acid is an inorganic acid such as hydrogen chloride (HCl), sulfuric acid ($H_2SO_4$), phosphoric acid ($H_3PO_4$), and the like. If present in the mixture of terminator, acyl halide and solvent, the acid is present in an amount from about 0.01 to about 2 weight percent, preferably in an amount from about 0.05 to about 1 weight percent and most preferably in an amount from about 0.1 to about 0.5 weight percent based on the weight of the solvent.

Tertiary amines are the preferred coupling catalysts for use in improved process according to the present invention and include trimethylamine, triethylamine, tributylamine, and 4-N,N-dimethylaminopyridine.

In the fmal product, the acyl moiety resulting from the reaction of the acyl halide is present in an amount equal to or greater than about 0.001 weight percent, preferably equal to or greater than about 0.01 weight percent, more preferably equal to or greater than about 0.1 weight percent and most preferably equal to or greater than about 1 weight percent based on the weight of the polycarbonate composition. In the fmal product, the acyl moiety resulting from the reaction of the acyl halide is present in an amount equal to or less than about 15 weight percent, preferably equal to or less than to about 10 weight percent, more preferably equal to or less than about 5 weight percent and most preferably equal to or less than about 1 weight percent based on the weight of the polycarbonate composition.

In the final product, the terminal moiety resulting from the reaction of the terminator is present in an amount equal to or greater than about 0.001 weight percent, preferably equal to or greater than about 0.01 weight percent, more preferably equal to or greater than about 0.1 weight percent and most preferably equal to or greater than about 1 weight percent based on the weight of the polycarbonate composition. In the final product, the terminal moiety resulting from the reaction of the terminator is present in an amount equal to or less than about 10 weight percent, preferably equal to or less than to about 7.5 weight percent, more preferably equal to or less than about 5 weight percent, even more preferably equal to or less than about 2.5 weight percent and most preferably equal to or less than about 1 weight percent based on the weight of the polycarbonate composition.

The present invention is applicable to produce polycarbonate compositions by a solution polymerization or interfacial polymerization processes. Further, the present invention is applicable to produce polycarbonate compositions by a batch process or a continuous process. In a batch process preferably the pH of the monomer solution prior to the phosgenation reaction is between about 12 to about 14 preferably about 12.5 to about 13.5, but not less than about 9. An excess of alkaline is high enough to ensure the phosgenation reaction continues. The phosgene is present in an amount between about 100 to about 150 weight percent, preferably in an amount between about 100 to about 130 weight percent and most preferably between about 110 and about 125 weight percent based on the weight of the dihydric phenol. The terminator and the acyl halide may be added independently or preferably together in the same solution when at least 25 percent of the hydroxyl groups in the dihydric phenol have been converted to chloroformate groups by reaction of the hydroxyl groups with phosgene. Preferably the pH of the reaction mixture is between about 10 to about 11 when the terminator and acyl halide are added. Upon completion of polymerization process, recovery of the polycarbonate product can be effected by any of the methods know in the art.

In a continuous process preferably the pH of the monomer solution prior to the phosgenation reaction is between about 12 to about 14 preferably about 12.5 to about 13.5. Preferably the dihydric phenol is completely dissolved in the aqueous phase to avoid plugging in the process. The phosgene is present in an amount between about 100 to about 150 weight percent, preferably in an amount between about 100 to about 130 weight percent and most preferably between about 100 and about 125 weight percent based on the weight of the dihydric phenol. The terminator and the acyl halide may be added at any point, independently or preferably together in the same solution when, at least 25 percent of the hydroxyl groups in the dihydric phenol have been converted to chloroformate groups by reaction of the hydroxyl groups with phosgene. Preferably the solution containing the acyl halide and/or the terminator contains an inorganic acid, such as HCl, $H_2SO_4$ or $H_3PO_4$, in an amount of about 0.05 weight percent to about 2 weight percent, preferably the inorganic acid is present at a level where it is soluble in the organic phase. Upon completion of polymerization process, recovery of the polycarbonate product can be effected by any of the methods know in the art.

The invention is illustrated in the following examples:

EXAMPLES

The following reactants were used as indicated:
"Bisphenol A" is 2,2-bis(4-hydroxyphenyl)propane;
"Phosgene; is carbonyl chloride, $COCl_{12}$
"Triphosgene" is hexachloromethylcarbonate;
"Caustic solution" unless otherwise specified is a 50 weight percent aqueous solution of sodium hydroxide, NaOH;
"Triethylamine";
"Trimellitic trichloride" is 1, 2, 4-benzenetricarboxyl trichloride;
"Acryloyl chloride" is $H_2C=CHCOCl$ and
"Para t-butyl phenol";
For the polymer analysis and evaluations the following test methods were used:
"Molecular Weight" weight average ($M_w$) and number average ($M_n$) evaluations were done by standard gel permeation chromatographic analysis using a bisphenol A polycarbonate standard and using standard molecular weight calculations, including the dispersity index (Disp);

"Melt Flow Rate" (MFR) was determined according to ASTM D 1238 on a Zwick Plastometer 4105 melt flow rate apparatus at conditions of 300° C. and an applied load of 1.2 kg and "Melt Viscosity" was determined as a function of shear rate on the molten polymer. The measurements were carried out by standard oscillating rotational viscosimetry means using a cone/plate system at 280° C. with a pre-heating time of 8 minutes and a plate distance of 50 micrometers ($\mu$m) at a frequency range of 0.1 to 100 reciprocal seconds ($s^{-1}$). The zero-viscosity was determined by extrapolation of the viscosity versus shear frequency curve to a frequency of zero.

Example 1

A 10 liter reactor was purged with argon and charged with 4.3 kg water and 0.7 kg (3.07 moles) bisphenol A. To this mixture was added 0.45 kg of a 50 weight percent caustic solution (2.81 moles) and the mixture was stirred. Then, the reactor was charged with 2 kg methylene chloride. The mixture was vigorously stirred and phosgene was added at a rate of 0.04 grams/second (0.04 moles/second). After 225 grams (2.27 moles) of phosgene was added, a solution of 3.2 grams (0.012 moles) trimellitic trichloride and 16.4 grams (0.110 moles) para t-butyl phenol in 120 milliliters (ml) methylene chloride was added at once. The addition of phosgene was continued until 375 grams (3.79 moles) was consumed. Then, a solution of 5.5 grams (0.054 moles) triethylamine in 2 kg methylene chloride was added and stirred for another 15 minutes in order to achieve the coupling. After that, a solution of 800 ml HCl (20 weight percent) and 4 liters water was added. The mixture was stirred for 10 minutes at 1500 rpm and then the phases were allowed to separate. The organic phase was treated with 1800 ml phosphoric acid (10 weight percent) and 4 liters water. Then, the organic phase was washed four times with 500 ml water until neutral and 1375 ml hexane was added to the polymer solution in order to precipitate the polycarbonate polymer. The organic solvents (hexane and methylene chloride) were completely evaporated by hot water steam and the polymer was dried at 120° C. overnight in a vacuum. The resulting polycarbonate composition had a Mn of 14,930 gram per mole (g/mole), a Mw of 39,630 g/mole, a MFR of 3.4 grams per 10 minutes (g/10 min.) and a zero shear viscosity of 5,700 Pascal-seconds (Pa*s) demonstrating branching due to the incorporation of the trimellitic trichloride.

Example 2

A 10 liter reactor as described in Example 1 was loaded with 4.3 kg water and 0.7 kg (3.07 moles) bisphenol A. To this 0.45 kg of a 50 weight percent caustic solution and 2 kg methylene chloride were successively added. Phosgene was passed through the solution at a rate of 0.04 g/s (0.04 moles/second). After 225 grams (2.27 moles) of phosgene was added, 6.94 grams (0.076 moles) of acryloyl chloride combined with 11.5 g of para t-butyl phenol in a solution of 120 ml methylene chloride was added over 2 minutes. The addition of phosgene continued until 375 grams (3.79 moles) of phosgene was reacted. Then, 5.5 grams (0.054 moles) triethylamine (in a solution of 2 kg methylene chloride) was added. The solution was stirred for 15 minutes in order to achieve the coupling.

The solution was washed and purified and the polycarbonate composition was isolated and analyzed as described in the previous example. The polycarbonate composition had a Mn of 10,551 g/mole and a Mw of 24,276 g/mole. The polymer was analyzed by nuclear magnetic resonance ($^1$H-NMR) and it was determined that 88 mole percent of the acryloyl groups were incorporated into the polycarbonate: 400, 13 MHz, $\delta$(ppm):

6.59 (Hc, $^1$H, $J_{HC,Hb}$=1.2 Hz and $J_{HC,Ha}$=17 Hz, dd)
6.30 (Ha, $^1$H, $J_{Ha,Hb}$=10 Hz and $J_{Ha,Hc}$=17 Hz, dd)
5.99 (Hb, $^1$H, $J_{Hb,Hc}$=1.2 Hz and $J_{Hb,Ha}$=10 Hz, dd).

Example 3

To 4.56 grams of bisphenol A dissolved in 28 ml 1.5N sodium hydroxide solution was added 10 ml of methylene chloride. A solution of 5 grams of triphosgene in 50 ml of methylene chloride was prepared. 13 ml of the triphosgene solution was then added at a rate of 0.05 ml per 10 seconds. Following the addition of the triphosgene, a mixture of 9 ml trimellitic trichloride solution (prepared by adding 91 mg to 30 ml methylene chloride) and 4 ml of a p-tert butylphenol solution (prepared by adding 0.425 g to 25 ml methylene chloride) was added. An additional 13 ml of the triphosgene/methylene chloride solution was then added. Following the addition of the triphosgene/methylene chloride solution, 20 ml of a triethylamine solution (prepared by adding 0.25 g to 100 ml methylene chloride) was added and stirred for 15 minutes.

The reaction mixture was washed and purified and the polycarbonate composition was isolated and analyzed as described hereinabove. The polycarbonate composition had a Mn of 13,450 g/mole, a Mw of 45,670 g/mole and a zero-shear viscosity of 4,100 Pa*s demonstrating branching due to the incorporation of the trimellitic trichloride.

Example 4

An alkaline aqueous solution containing 3.12 weight parts per hour bisphenol A, having a pH of 13 and a flow of 22.58 weight parts per hour, is combined with a methylene chloride solution containing 1.63 weight parts per hour of phosgene and having a flow of 13.19 weight parts per hour to form a reaction mixture and thoroughly mixed in a continuous reactor. After about 90 percent of the phosgene had reacted with the bisphenol A to form intermediate chloroformate groups (greater than 25 percent of the hydroxyl groups in the dihydric phenol had been converted to chloroformate groups), and a certain amount of the chloroformate groups had reacted further to form reactive oligomers as well as underwent hydrolysis, to result in a chloroformate concentration of about 9.5 weight parts per hour chloroformate groups, a methylene chloride solution containing 0.18 weight parts per hour para-t-butyl phenol, 15 weight parts per hour trimellitic trichloride and having a flow of 0.77 weight parts per hour was added to the reaction mixture. After the reaction mixture was thoroughly mixed and allowed to react, a 30 weight percent NaOH solution having a flow of 0.81 weight parts per hour was added and thoroughly mixed with the reaction mixture. Then, the reaction mixture flowed into a flash-pot where methylene chloride was vaporized to release the heat of the phosgenation reaction. At the outlet of the flash-pot, a methylene chloride solution containing 9 weight percent triethylamine (weight percent based on methylenechloride) and having a flow of 0.47 weight parts per hour was added to the reaction mixture. The organic stream was washed with a 1.5 weight percent aqueous hydrochloric acid solution and with water afterwards by a rotary mixer. The organic stream was then separated from the water. Following evaporation of the methylene chloride white polycarbonate flakes was obtained.

The polycarbonate composition had a Mn of 14,600 g/mole, a Mw of 29,800 g/mole, a MFR of 2.9 g/10 min. and the following rheological properties: a zero-shear viscosity of 3,100 Pa*s, an overall viscosity of 2,290 Pa*s at 4.22 Hertz (Hz), 1753 Pa*s at 10 Hz, 1,157 Pa*s at 23.7 Hz, 871 Pa*s at 32 Hz and 544 Pa*s at 75 Hz.

The final process water was analyzed by a liquid chromatographic method for residual trimellitic acid, the hydrolysis product of trimellitic trichloride. No trimellitic acid was found, indicating that a minimum of 99.8% of the trimellitic trichloride was orporated into the polymer backbone.

What is claimed is:

1. A process for producing a polycarbonate composition comprising the steps of:
   a) reacting phosgene and a dihydric phenol until at least 25 percent of the hydroxyl groups in the dihydric phenol have been converted to chloroformate groups,
   b) adding an acyl halide other than phosgene to the reaction mixture after said at least 25 percent of the hydroxyl groups have been converted,
   c) adding a chain terminator to the reaction mixture after said at least 25 percent of the hydroxyl groups have been converted and
   d) completing the polymerization reaction.

2. The process of claim 1 wherein the chain terminator and the acyl halide are added to the reaction mixture when 40 to 100 percent of the hydroxyl groups have been converted to chloroformate groups.

3. The process of claim 1 wherein in step a) phosgene, the dihydric phenol, an aqueous solution of an inorganic base and an organic solvent are mixed and the polycarbonate composition is produced in an interfacial process.

4. The process of claim 1 wherein from the amount of the acyl halide added to the reaction is from about 0.001 to about 15 weight percent based on the weight of the polycarbonate composition.

5. The process of claim 1 wherein the chain terminator is added to the reaction in an amount from about 0.001 to about 10 weight percent based on the weight of the polycarbonate composition.

6. The process of claim 1 wherein the chain terminator and the acyl halide are diluted with an organic solvent before they are added to said reaction mixture, said organic solvent is the same for both the chain terminator and the acyl halide.

7. The process in claim 6 wherein the organic solvent is methylene chloride, dioxane, dimethyl ether, dimethyl glycol diether, diethyl glycol diether, dibutyl glycol diether, or chlorobenzene.

8. The process of claim 1 wherein in step b) a mixture containing from about 0.001 to about 70 weight percent of the chain terminator, from about 0.001 to about 70 weight percent of the acyl halide, from 0 to about 2 weight percent of an acid and an organic solvent is added to the reaction mixture obtained in step a), said acyl chloride, terminator, and acid weight percents are based on the weight of the organic solvent wherein said organic solvent is present in an amount from about 1 to about 100 weight percent based on the weight of the dihydric phenol.

9. The process in claim 8 wherein the organic solvent is methylene chloride, dioxane, dimethyl ether, dimethyl glycol diether, diethyl glycol diether, dibutyl glycol diether, or chlorobenzene.

10. The process of claim 1 wherein the polymerization process is conducted continuously.

11. The process of claim 1 wherein the acyl halide is a mono-functional acyl chloride, di-functional acyl chloride or a tri-functional acyl chloride.

12. The process of claim 1 wherein the acyl halide is acryloylchloride, methacryloylchloride, benzoylchloride, benzocyclobutene-4-carbonylchloride, trimellitic anhydride chloride, 4-chloroformyl phthalic anhydride, 2,4-dihydroxy-6-chloro-formyloxy-triazine, benzenesulfonylchloride, chlorodiphenylphosphine, chlorodiphenylphosphineoxide, chlorotrimethylsilane, terephthaloyl chloride, sebacoylchloride, 3,5-dichloroformylbenzoic acid, thionylchloride, dichlorophenylphosphine, dichlorophenylphosphineoxide, dichlorodimethylsilane, dichlorodiphenylsilane, trimellitic trichloride, trimesoylchloride, 1,2,3 propanetricarboxylic chloride, trimethylolpropane tris (chloroformate), tris (chloroformyloxy)triazine, cyanuric chloride, 1,3,6 naphthaline-trisulfonyltrichloride, phosphorous trichloride, trichlorophenylsilane, or thiophenetetracarboxylic acid chloride.

13. The process of claim 1 wherein the acyl halide is acryloylchloride, trimellitic anhydride chloride or trimellitic trichloride.

14. The process of claim 1 wherein the chain terminator is phenol, para-t-butyl phenol, p-cumyl phenol or para-t-octyl phenol.

15. A polycarbonate composition produced by the process of claim 1.

16. A process for producing a molded polycarbonate article comprising the steps of
   i) optionally mixing the polycarbonate produced according to the process of claim 1 with one or more additives to prepare a polycarbonate composition and
   ii) molding the polycarbonate produced according to the process of claim 1 or the polycarbonate composition prepared in step i) to an article.

17. A molded article comprised of a polycarbonate produced according to the process of claim 1.

* * * * *